US006973358B2

(12) United States Patent
Yamamoto et al.

(10) Patent No.: US 6,973,358 B2
(45) Date of Patent: Dec. 6, 2005

(54) DEFECT INFLUENCE DEGREE EVALUATION METHOD AND DESIGN SUPPORT SYSTEM

(75) Inventors: Noriaki Yamamoto, Zushi (JP); Tatsuya Suzuki, Yokohama (JP); Takayuki Nishi, Yokohama (JP); Toru Wakuta, Nakajo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/923,044

(22) Filed: Aug. 23, 2004

(65) Prior Publication Data

US 2005/0071029 A1 Mar. 31, 2005

(30) Foreign Application Priority Data

Sep. 30, 2003 (JP) ............................. 2003-339154

(51) Int. Cl.⁷ ............................................ G06F 19/00
(52) U.S. Cl. ..................... 700/98; 700/97; 700/110; 700/107
(58) Field of Search ............................ 700/97, 98, 103, 700/105, 108–111, 117; 702/185; 703/4; 716/5

(56) References Cited

U.S. PATENT DOCUMENTS

| | | | | |
|---|---|---|---|---|
| 5,475,695 A | * | 12/1995 | Caywood et al. | ............ 714/738 |
| 5,617,321 A | * | 4/1997 | Frizelle et al. | ............... 700/104 |
| 5,649,169 A | * | 7/1997 | Berezin et al. | ................ 703/23 |
| 6,088,712 A | * | 7/2000 | Huang et al. | ................ 715/526 |
| 6,108,586 A | * | 8/2000 | Suzuki et al. | ................ 700/117 |
| 6,230,066 B1 | * | 5/2001 | Sferro et al. | ................. 700/104 |
| 6,233,719 B1 | * | 5/2001 | Hardikar et al. | ................ 716/1 |
| 6,253,115 B1 | * | 6/2001 | Martin et al. | .................. 700/97 |
| 6,256,093 B1 | * | 7/2001 | Ravid et al. | .............. 356/237.2 |
| 6,341,241 B1 | * | 1/2002 | Mugibayashi et al. | ...... 700/110 |
| 6,401,000 B1 | | 6/2002 | Suzuki et al | |
| 6,421,122 B2 | * | 7/2002 | Nara et al. | ................... 356/394 |
| 6,526,326 B2 | | 2/2003 | Suzuki et al | |
| 6,553,273 B1 | | 4/2003 | Suzuki et al | |
| 6,625,511 B1 | * | 9/2003 | Suzuki et al. | ............... 700/110 |

FOREIGN PATENT DOCUMENTS

| | | |
|---|---|---|
| JP | 10-334151 | 12/1998 |
| JP | 2001-100838 | 4/2001 |
| JP | 2001-121367 | 5/2001 |

OTHER PUBLICATIONS

"Project Quality [of plant construction projects]" -Author Unknown. Project FKD—Viewed at: http://www1.neweb.ne.jp/wb/fukud/qualityeng.htm.*

* cited by examiner

*Primary Examiner*—Albert W. Paladini
*Assistant Examiner*—Michael D. Masinick
(74) *Attorney, Agent, or Firm*—Antonelli, Terry, Stout and Kraus, LLP.

(57) ABSTRACT

At a stage before manufacture (product design stage or manufacturing process design stage), influence of defect occurrence in a component or process on other components and processes is estimated, and defect importance is evaluated to support the manufacturing process design. Failure rates of components are previously stored in a database. At a product design stage, an assembly fraction defective is calculated for an assembly process of each component of the product. Component arrangement relations are extracted from product design information. A component fraction defective is calculated based on the assembly fraction defective and the component failure rate. A numerical value indicating an influence degree of each assembly process is calculated by multiplying component fraction defectives by coefficients based on of the component arrangement relations and the component fraction defective, for relating components in each assembly process. Thereby, influence degrees of each component and process are evaluated.

8 Claims, 13 Drawing Sheets

FIG. 6

| HIERARCHY NUMBER | COMPONENT NAME | COMPONENT NUMBER | THE NUMBER OF COMPONENTS | PARENT COMPONENT NAME | PARENT COMPONENT NUMBER | MATERIAL | MASS | MAXIMUM DIMENSION | ASSEMBLY DIRECTION | MATTERS TO BE ATTENDED TO |
|---|---|---|---|---|---|---|---|---|---|---|
| 1 | B_Plate | 2Y001 | 1 | MG_Assy | 12345 | SS400 | 2.7kg | 250mm | (0,0,1) | |
| 2 | Bracket | 3Y001 | 1 | MG_Assy | 12345 | S45C | 0.5kg | 90mm | (0,0,1) | ATTEND TO ASSEMBLY DIRECTION |
| 3 | Screw_M | 4S003 | 2 | MG_Assy | 12345 | SCM435 | 0.02kg | 30mm | (0,0,1) | |
| 4 | Motor_Assy | 2Y002 | 1 | MG_Assy | 12345 | | 1.7kg | 120mm | (0,1,0) | |
| 4-1 | Motor_A | M6001 | 1 | Motor_Assy | 2Y002 | | 0.7kg | 120mm | (0,1,0) | |
| 4-2 | Gear | 4Y102 | 1 | Motor_Assy | 2Y002 | SUS304 | | | (0,1,0) | |
| 4-3 | Screw_T | 4S001 | 1 | Motor_Assy | 2Y002 | SCM435 | 0.01kg | 10mm | (0,1,0) | |
| ...... | ...... | ...... | ...... | ...... | ...... | | | | | |

| CONSTRAINT INFORMATION | COMPONENT NAME (1) | PARENT COMPONENT NAME (1) | KIND OF CONSTRAINT PORTION (1) | COMPONENT NAME (2) | PARENT COMPONENT NAME (2) | KIND OF CONSTRAINT PORTION (2) |
|---|---|---|---|---|---|---|
| ALIGN | B_Plate | MG_Assy | SF | Bracket | MG_Assy | SF |
| MATE_OFF | B_Plate | MG_Assy | SF | Bracket | MG_Assy | SF |
| ALIGN | Screw_M | MG_Assy | AXIS | B_Plate | MG_Assy | AXIS |
| ALIGN | Screw_M | MG_Assy | AXIS | Motor_A | Motor_Assy | AXIS |
| ALIGN | Gear | Motor_Assy | AXIS | Motor_A | Motor_Assy | AXIS |
| MATE | Gear | Motor_Assy | SF | Motor_A | Motor_Assy | SF |
| ...... | ...... | ...... | ...... | ...... | ...... | ...... |

| INTERFERENCE INFORMATION | COMPONENT NAME (1) | PARENT COMPONENT NAME (1) | COMPONENT NAME (2) | PARENT COMPONENT NAME (2) |
|---|---|---|---|---|
| 0 | B_Plate | MG_Assy | Bracket | MG_Assy |
| INTF | B_Plate | MG_Assy | Screw_M | MG_Assy |
| 0 | Motor_A | Motor_Assy | Gear | Motor_Assy |
| INTF | Screw | MG_Assy | Bracket | MG_Assy |
| -------- | -------- | -------- | | |

| No. | COMPONENT NAME | COMPONENT NUMBER | BASIC FUNCTION 1 | BASIC FUNCTION 2 |
|---|---|---|---|---|
| 1 | B_Plate | 2Y001 | HOLDING | PLATE |
| 2 | Bracket | 3Y001 | HOLDING | L BRACKET |
| 3 | Screw_M | 4S003 | FASTENING | SCREW FASTENING |
| 4 | Motor_A | M6001 | MOTOR | ROTATIONAL TRANSMISSION |
| 5 | Gear | 4Y002 | TRANSMISSION | ROTATIONAL TRANSMISSION |
| 6 | Scerw_T | 4S001 | FASTENING | SCREW FASTENING |
| 7 | Pole | 4Y101 | FASTENING | SUPPORT SCREW |
| -------- | -------- | -------- | | |

FIG. 16

| PRODUCT COMPONENT | THE NUMBER OF COMPONENTS | COMPONENT FAILURE RATE | COMPONENT COST | | PRESET WORKSHOP COEFFICIENT | PROCESS | WORK | ASSEMBLY TIME | ASSEMBLY FRACTION DEFECTIVE | | DISASSEMBLY REPAIR COST AT TIME OF DEFECT FINDING | | | | FRACTION DEFECTIVE OF COMPONENT | DEGREE OF IMPORTANCE OF COMPONENT |
|---|---|---|---|---|---|---|---|---|---|---|---|---|---|---|---|---|
| | | | | | | | | | | | CONFIRMATION WORK | FUNCTION TEST | INSPECTION BEFORE SHIPPING | | | |
| | | | | | | | INSPECTION BEFORE SHIPPING | 3.1 | 1 | | | | | | | |
| | | | | | | | FUNCTION TEST | 2.2 | 1 | | | | | | | |
| | | | | | | | Cable_CB | 0.5 | 234 | | | | | | | |
| | | | | | | | Cramp_L | 0.1 | 60 | | | | | | | |
| | | | | | | | Cable_CM | 0.6 | 318 | | | | | | | |
| | | | | | | | Cramp_M | 0.1 | 20 | | | | | | | |
| | | | | A:(1.0,1.0,1.0) | | | Cable_CP | 0.7 | 354 | | | | | | | |
| | | | | | MG Assy | | Cramp_S | 0.1 | 20 | | | | | | | |
| | | | | | | | CONFIRMATION WORK | 1.1 | 1 | | | | | | | |
| | | | | | | | Screw_S | 0.3 | 20 | | | | | | | |
| | | | | | | | PK | 0.2 | 82 | | | | | | | |
| | | | | | | | Pole | 0.3 | 40 | | | | | | | |
| | | | | | | | Screw_L | 0.3 | 40 | | | | | | | |
| | | | | | | | C_Box | 0.1 | 62 | | | | | | | |
| | | | | | | | Screw_M | 0.5 | 40 | | | | | | | |
| | | | | | | | Motor_Assy | 0.1 | 62 | | | | | | | |
| | | | | | | | B_Plate | 0.1 | 1 | | | | | | | |
| | | | | O:(0.8,1.5,0.7) | Motor Assy | | Screw_T | 0.2 | 60 | | | | | | | |
| | | | | | | | Gear | 0.2 | 135 | | | | | | | |
| | | | | | | | Screw | 0.9 | 120 | | | | | | | |
| | | | | | | | Motor_A | 0.1 | 99 | | | | | | | |
| | | | | | | | Bracket | 0.1 | 1 | | | | | | | |
| MG_Assy | 30 | 60 | 58,080 | | | | | | 57 | 1,630 | 2,849 | 2,853 | 2,568 | 3 | 1 |
| B_Plate | 1 | 2 | 8,000 | | | | | | 01 | 1 | | | | | |
| Motor_Assy | 1 | 5 | 30,025 | | | | | | 01 | 62 | 9,164 | 9,172 | 8,255 | 67 | 55 |
| Bracket | 1 | 2 | 3,000 | | | | | | 01 | 1 | | | | 3 | 0 |
| Motor_A | 1 | 2 | 25,000 | | | | | | 01 | 66 | 1,483 | 1,620 | 1,485 | 68 | 44 |
| Screw | 4 | 0 | 20 | | | | | | 11 | 80 | 7,903 | 8,040 | 6,512 | 80 | 2 |
| Gear | 1 | 1 | 2,000 | | | | | | 02 | 90 | 73 | 210 | 189 | 91 | 7 |
| Screw_T | 1 | 1 | 5 | | | | | | 03 | 40 | 713 | 850 | 765 | 40 | 1 |
| Screw_M | 2 | 0 | 10 | | | | | | 05 | 40 | 69 | 206 | 185 | 40 | 0 |
| C_Box | 1 | 5 | 5,000 | | | | | | 01 | 62 | 133 | 119 | 107 | 67 | 11 |
| Screw_L | 2 | 0 | 5 | | | | | | 03 | 40 | 1,591 | 2,014 | 1,631 | 40 | 0 |
| Pole | 4 | 0 | 1,000 | | | | | | 03 | 40 | 66 | 60 | 54 | 40 | 2 |
| PK | 1 | 24 | 8,000 | | | | | | 02 | 82 | 478 | 478 | 430 | 106 | 23 |
| Screw_S | 1 | 0 | 5 | | | | | | 03 | 20 | 2,513 | 2,674 | 2,166 | 20 | 0 |
| Cramp_S | 3 | 0 | 15 | | | | | | 01 | 20 | 66 | 60 | 54 | 20 | 0 |
| Cable_CP | 1 | 6 | 2,000 | | | | | | 07 | 354 | 0 | 189 | 170 | 360 | 22 |
| Cramp_M | 1 | 0 | 5 | | | | | | 02 | 20 | 0 | 162 | 146 | 20 | 0 |
| Cable_CM | 1 | 4 | 1,000 | | | | | | 06 | 318 | 0 | 761 | 616 | 322 | 11 |
| Cramp_L | 3 | 0 | 15 | | | | | | 01 | 60 | 0 | 153 | 138 | 60 | 1 |
| Cable_CB | 1 | 7 | 3,000 | | | | | | 05 | 234 | 0 | 1,025 | 830 | 241 | 20 |

DEFECT INFLUENCE DEGREE EVALUATION METHOD AND DESIGN SUPPORT SYSTEM

INCORPORATION BY REFERENCE

The present application claims priority from Japanese application JP2003-339154 filed on Sep. 30, 2003, the content of which is hereby incorporated by reference into this application.

BACKGROUND OF THE INVENTION

The present invention relates to a technique for evaluating products manufactured by assembling a plurality of components, such as home electronic appliances, information devices and manufacturing apparatuses, and the manufacturing process of the products, and supporting the design. In particular, the present invention relates to a method for previously evaluating the influence exerted on a product by a detective at the time of assembly, and design support based on a result of the evaluation.

As a conventional technique for evaluating assembly defectives which might be caused when assembling a product, before manufacture start of the product, there is a technique described in JP-A-10-334151 (corresponding to U.S. Pat. Nos. 6,108,586, 6,553,273, 6,401,000 and 6,526,326) and JP-A-2001-121367 (corresponding to U.S. Pat. No. 6,108,586). In this technique, an estimated value of an assembly fraction defective is calculated on the basis of operation contents of component assembly work and information concerning component properties. Specifically, basic operation kinds for representing operation contents of the component assembly work are determined as standard assembling operations. For each standard assembly operation, a fraction defective coefficient by standard assembly operation is set. The fraction defective coefficient is a coefficient indicating the probability that standard assembly operation cannot be conducted certainly when conducting the standard assembly operation under a reference condition. This fraction defective coefficient by standard assembly operation is corrected by a component condition correction factor to calculate an estimate value of the assembly fraction defective.

Furthermore, a method for evaluating and estimating influence of the manufacturing workshop environment on defect occurrence and supporting improvements in the workshop is disclosed in JP-A-2001-100838 (corresponding to U.S. Pat. No. 6,625,511).

Besides the technique described in JP-A-10-334151, JP-A-2001-121367 and JP-A-2001-100838, the FMEA (Failure Mode Effect Analysis) is generally known as a technique for conducting quality evaluation of products before a defect or a failure actually occurs. The FMEA is a technique used in the design stage of products. First, "failure phenomena that can occur in individual components included in a product" are estimated on the basis of experience of the evaluator himself or herself, and failure phenomena for respective components are summarized in a table form. The evaluator himself or herself estimates "influence exerted on the product by it when it has actually occurred" on the basis of the table. By thus conducting estimation successively on the basis of the table, quality evaluation of the product is conducted. Furthermore, in the FMEA, there is a technique in which the estimator provides a estimated failure phenomenon of an individual component with a failure rate (the probability that a failure will occur), provides a product failure estimated to be caused by a failure of an individual component with a degree of importance, and conjectures an importance degree of a defect or a failure of an individual component. The FMECA (Failure Mode, Effect & Criticality Analysis) is such a technique.

In the techniques described in JP-A-10-334151, JP-A-2001-121367, and JP-A-2001-100838, relations to other components and the assembly order are not taken into consideration. Therefore, it has been demanded to be able to evaluate the influence of occurrence of a certain defect on other components and the greatness of influence caused when finding of the defect is delayed. Furthermore, as for evaluation of a manufacturing process, the conventional technique merely takes whether there is a check process into consideration, and evaluation where to place the check process in the whole manufacturing process in order to conduct confirmation work with the influence of defects minimized cannot be conducted. Thus, the conventional technique is not sufficient in some aspects to support the process design. Among defects, there is also a defect that exerts great influence when it has occurred even if its occurrence frequency is comparatively low. Therefore, a method and a system capable of evaluating an influence degree of a defect by taking not only the occurrence frequency of the defect but also the influence of the defect on other components and the importance of the defect into consideration have been demanded.

The FMEA is a technique for finding the importance of a defect. Since the FMEA is a qualitative evaluation method that advances analysis according to the thinking of the evaluator, however, the FMEA greatly depends upon the experience and knowledge of the evaluator. Therefore, the FMEA has a problem that analysis without omission and analysis without an individual difference are difficult. The FMEA is a direct factor estimation method based on past phenomena. However, it is difficult to arrange, classify and take out past know-how. If defect modes are supposed so as to prevent omission and it is attempted to estimate a factor for each of the defect modes, the evaluation time becomes enormous.

SUMMARY OF THE INVENTION

The present invention has been achieved in order to solve the above-described problems. An object of the present invention is to estimate the influence of occurrence of a defect in a certain component or process on other components and processes, evaluate the importance of the defect, and support the design of the manufacturing process.

In order to achieve the object, in accordance with the present invention, in a defect influence degree evaluation method to be used at a design stage of a product including a plurality of components to calculate an assembly fraction defective, which represents a rate of becoming defective, with respect to an assembly process of each of the components included in the product, and evaluate an influence degree of each component and an influence degree of each process on the basis of the assembly fraction defective and design information of the product, the defect influence degree evaluation method includes the steps of: previously storing a failure rate of each of the components in a database; extracting component arrangement relations among components included in the product from the design information of the product; calculating a fraction defective of each of the components on the basis of the assembly fraction defective and the failure rate of the component; and multiplying a component fraction defective by a coefficient to obtain a resultant product with respect to each of components each having a relation at time when conducting each assembly process, on the basis of the component arrangement relations and a fraction defective of the component, calculating a numerical value indicating an influence degree of each assembly process by multiplying resultant products for the components each having a relation, and thereby evaluating an influence degree of each component and an influence degree of each process.

Furthermore, a design support system includes input means, output means, calculation means, storage means, and interface means serving as an interface to a design system for designing the product. The storage means includes a defect instance database for storing failure rates respectively of the components, and an assembly defect evaluation database. The calculation means extracts component arrangement relations among components included in the product from the design information of the product, calculates an assembly fraction defective, which represents a rate of becoming defective, with respect to an assembly process of each of the components included in the product by referring to the assembly defect evaluation database, calculates a fraction defective of each of the components on the basis of the assembly fraction defective and the failure rate of the component, and conducts processing of outputting the calculated results to the output means.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing component attributes acquired from a three-dimensional CAD system;

FIG. 7 is a diagram showing mutual constraint information among components acquired from a three-dimensional CAD system;

FIG. 8 is a diagram showing mutual contact information among components acquired from a three-dimensional CAD system;

FIG. 10 is a basic function setting table showing an example of setting of basic functions to components in an embodiment of the present invention;

FIG. 16 is a diagram showing a screen display example.

DETAILED DESCRIPTION OF THE INVENTION

Hereafter, embodiments of the present invention will be described with reference to the drawings.

Herein, single components and subassemblies are named generally as "components." Therefore, component assembling work includes both component assembling work and subassembly assembling work. Furthermore, assembled components or assembled subassemblies are named generally as "assembled components."

(1) Configuration of Design Support System

First, a configuration of a design support system using a defect influence degree evaluation method in an embodiment according to the present invention will be described.

Figure 1:
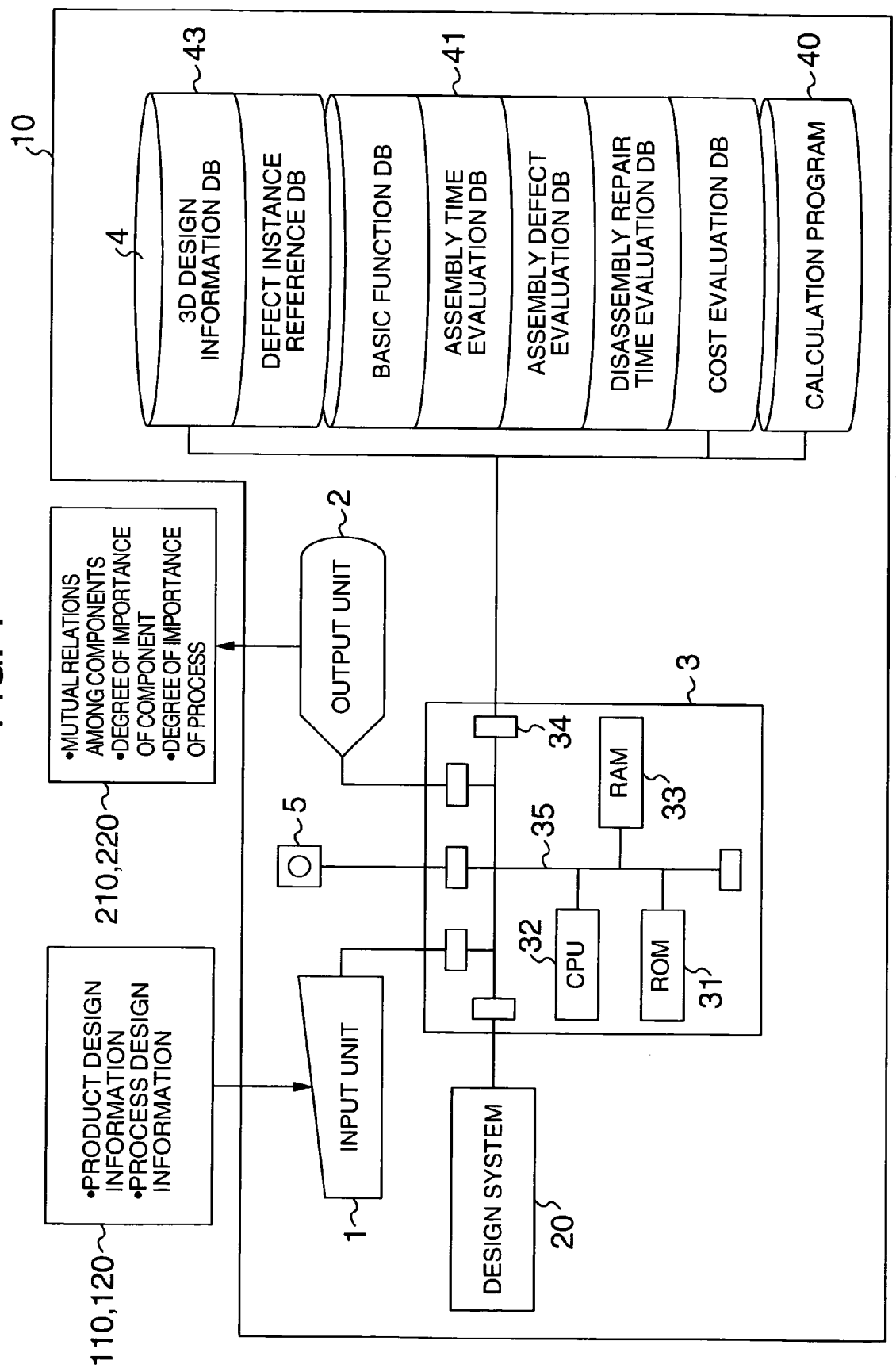
FIG. 1 is a diagram showing a configuration in a design support system according to a first embodiment of the present invention.

FIG. 1 is a diagram showing a configuration of a design support system according to an embodiment of the present invention.

A design support system 10 using a defect influence degree evaluation method in an embodiment according to the present invention is connected to a design system 20 to evaluate design information created in the design system 20. The design system 20 includes a two-dimensional CAD (Computer Aided Design) system, a three-dimensional CAD system, and a component information database for storing information such as component names, component numbers, materials, masses, numbers and unit prices. The design support system 10 includes input unit 1, such as a keyboard, a mouse, a pen input tablet, or input means using a storage medium, output unit 2 such as output means using display means like a display monitor and printing means, calculation unit 3 for executing defect influence degree evaluation and calculation processing, defect influence degree propagation route calculation processing, assemble time calculation processing and assembly fraction defective calculation processing, and a database 4.

The database 4 includes a calculation program 40, a predetermined evaluation database 41 and a past defect instance reference database 43.

The evaluation database 41 includes an assembly time evaluation database, an assembly defect evaluation database, a disassembly repair time evaluation database, a cost evaluation database and a basic function database.

In the assembly time evaluation database, "assembly time coefficients" by standard operation, first assembly time correction coefficients by assembly component nature, and second assembly time correction coefficients by assembled component nature are stored.

In the disassembly repair time evaluation database, a disassembly impossibility operation table, "disassembly time coefficient" by standard operation, and disassembly time correction coefficient by disassembly component nature are stored.

In the cost evaluation database, assembly time cost coefficients, disassembly time cost coefficients and purchased article cost data are stored. In the basic function database, a settable basic function list, and a basic function list associated with assembly operations, disassembly operation coefficients and component names unique to basic functions are stored.

The past defect instance reference database 43 includes, for example, a three-dimensional design information database and a defect instance database. These databases function singly as well. However, these databases are related to other databases as well on the basis of data of the basic functions set to components, component attributes (such as components names, component numbers and materials) and assembly operations, and these databases can be referred to arbitrarily.

The calculation unit 3 includes a CPU 32, a ROM 31 for storing a predetermined program, a RAM 33 for primarily storing various data, an input/output interface unit 34 and a bus line 35.

(2) Summary of Processing in Support Design System

Summary of processing in the support design system in the present system will now be described.

(2.1) Flow of Processing in the Whole Design Support System

Figure 2:
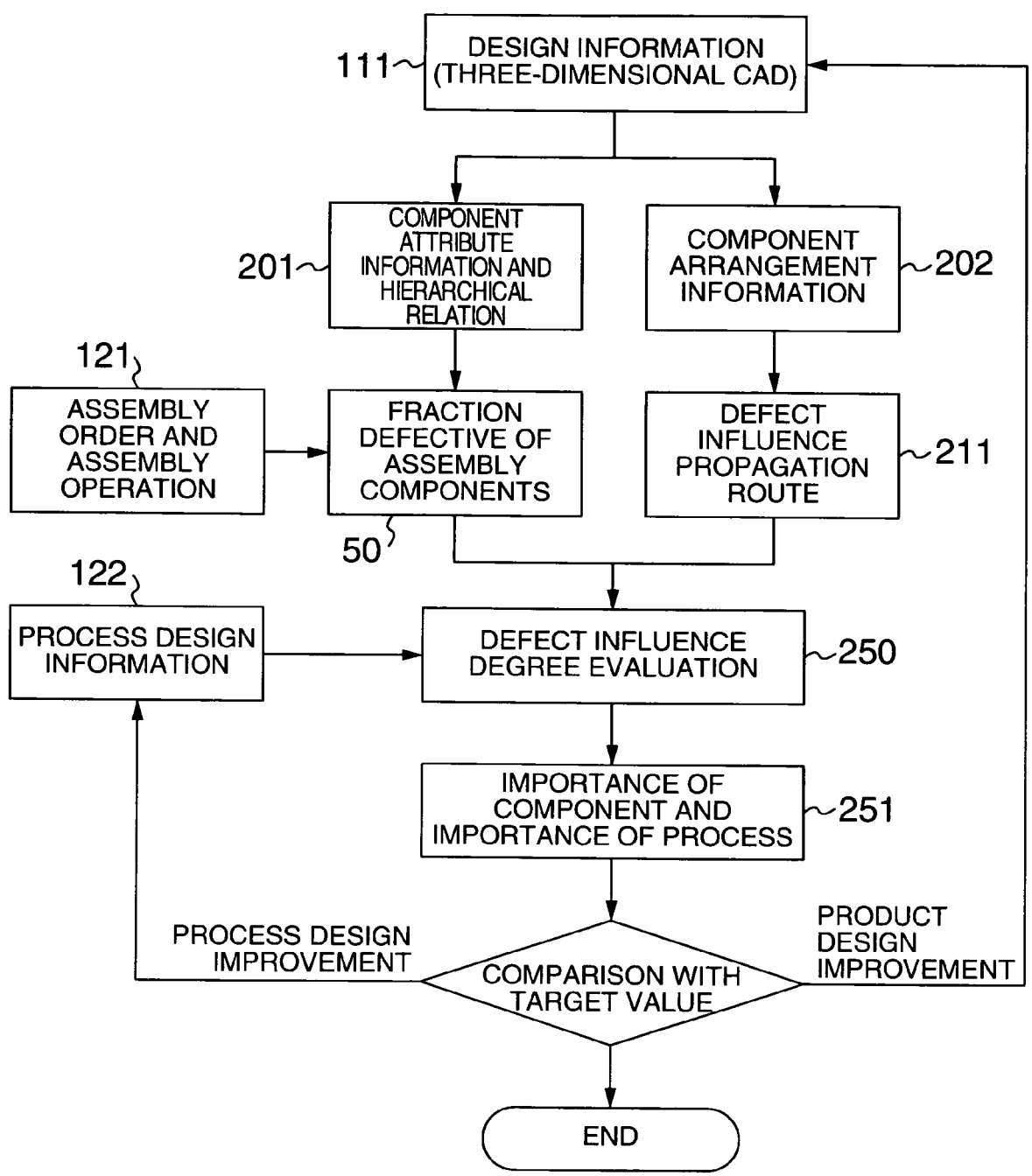
FIG. 2 is a diagram showing an information change in a design support system according to a first embodiment of the present invention.

FIG. 2 is a diagram showing summary of processing in the support design system in the present system by using a change of information which is the subject of the processing.

As shown in FIG. 2, product design information 111 output from the design system 20, such as the three-dimensional CAD system, is first input to the calculation unit 3. The calculation unit 3 extracts component attribute information and hierarchical relation 201 and component arrangement information 202 from the design information 111 thus input thereto. And the calculation unit 3 calculates fraction defective evaluation 50 of assembly components on the basis of the extracted component attribute information and hierarchical relation 201, assembly sequence and assembly operation 121 set by the designer on the basis of design information input from the design system 20, and data stored in the assembly defect evaluation database in the evaluation database 41. Furthermore, the calculation unit 3 calculates defect influence degree propagation route 211 from the component arrangement information 202 extracted from the design information 111. The calculation processing of the defect influence degree propagation route 211 is one of feature processing operations according to the present invention. It is feature processing of the present invention to evaluate the degree of difficulty of a measure taken when a component defect has been found and calculate a result of the defect influence degree evaluation 250 by adding setting of process design information 122 to the calculated fraction defective 50 of assembly components and the defect influence degree propagation route 211. As a result of the defect influence degree evaluation 250, a component importance degree and process importance degree 251 is output. In the present embodiment, problems are grasped by comparing the evaluation result with a preset target value, and improvement in product design and process design is supported.

In this way, at the design stage, an influence caused when a defect has occurred is evaluated quantitatively by making the most of, no only the fraction defective of assembly components, but also the defect influence propagation route found from the design information. Furthermore, evaluation of the process design is also conducted in synchronism at the same time as the evaluation of the product design.

(2.2) Example of Fraction Defective Calculation Method of Assembly Component

An example of a method for estimating the occurrence frequency of assembly work defects in products or components (assembly fraction defective) will now be described.

The method described now is a method for estimating the assembly fraction defective by representing the assembly work with standard assembly operation.

An operation kind (standard assembly operation) required to represent the operation contents of component assembly work is previously determined. For each standard assembly operation, an "assembly defect coefficient" by standard assembly operation is determined, which is a numerical value indicating the probability that the standard assembly operation cannot be conducted reliably when conducting the standard assembly operation under "a certain worker condition, a certain component condition and a certain workshop condition" predetermined for each standard assembly operation. Subsequently, the "assembly defect coefficient" by standard assembly operation is corrected by a second assembly defect correction coefficient, which corrects the "assembly defect coefficient" by standard assembly operation by using "nature of assembled component" in the assemble operation. And the occurrence frequency of assembly work defects in products or components (assembly fraction defective) is estimated by combining the occurrence frequency of standard operation work defects in a workshop for assembling products or components with the corrected assembly defect coefficient by standard assembly operation. As a method for estimating the occurrence frequency of assembly work defects by representing the assembly work with the standard assembly operation, a method described in JP-A-10-334151, JP-A-2001-121367 and JP-A-2001-100838 may also be used.

(3) Detailed Processing Contents of Design Support System

The processing contents of the design support system described with reference to FIG. 2 will now be described in more detail.

Figure 3:
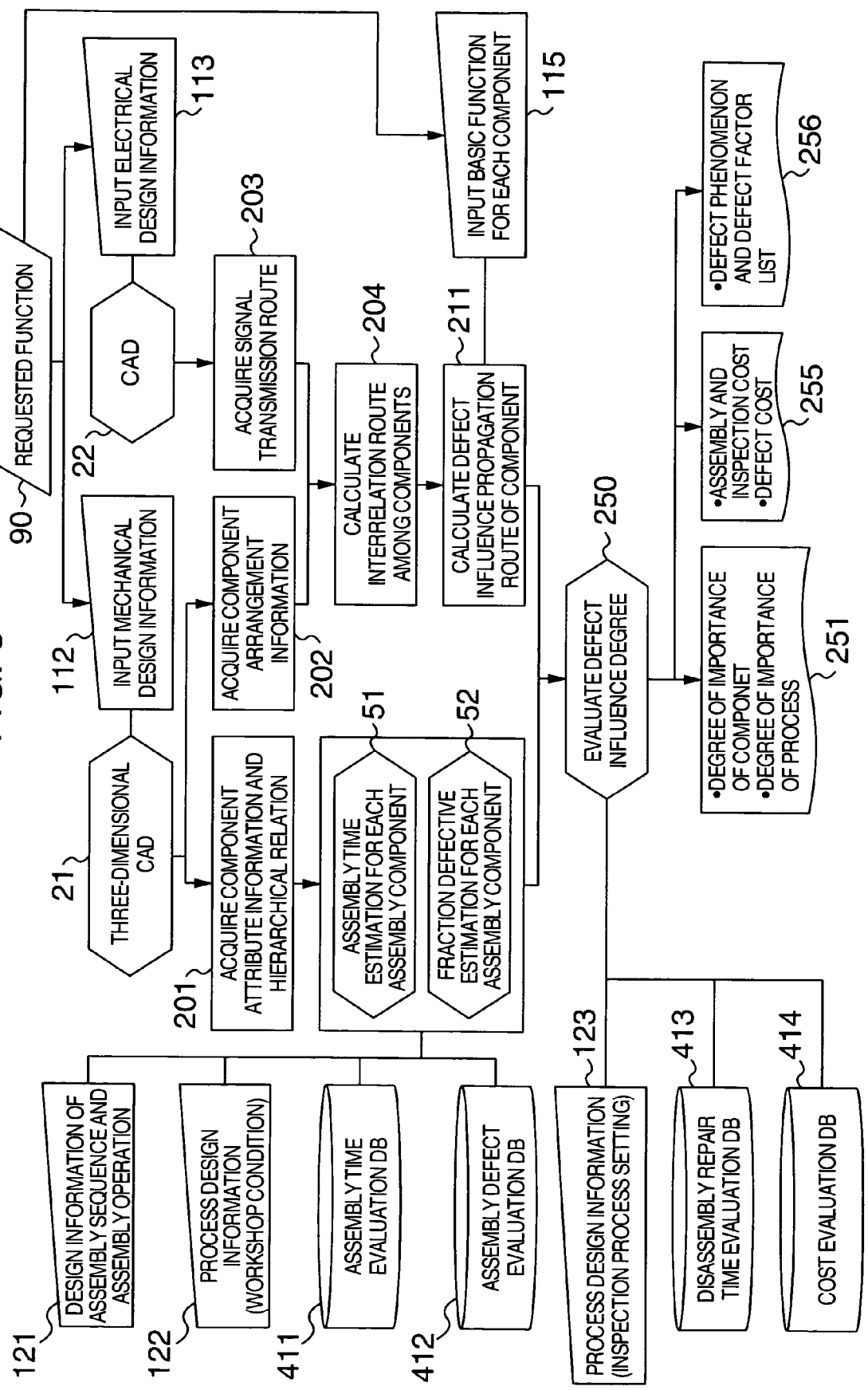
FIG. 3 is a diagram showing processing contents in a design support system according to a first embodiment of the present invention.

FIG. 3 is a diagram showing processing contents of a design support system in an embodiment of the present invention.

First, design specifications are studied in order to implement a requested function 90, i.e., specifications requested by the customer. For example, in the mechanical design department, mechanical design information inputting (structure modeling) 112 is conducted by using a three-dimensional CAD system 21 on the basis of the design specifications. Furthermore, in the electric design department, electric design information inputting (design of a circuit diagram and so on) 113 is conducted by using a two-dimensional CAD system 22 or the three-dimensional CAD system. Mutual relations among components are acquired from attribute information of components and arrangement information of components in the modeled assembly included in the information input to the CAD system, and interrelations among components are used to evaluate the defect influence degree. As a method for acquiring information from the CAD system, there is a method using a customize tool of the three-dimensional CAD. It is possible to acquire a result of calculation from modeling information and text input information by creating a program for information acquisition. In addition, it is also possible to create a program that automatically executes the calculation of interference check, which is a function of the three-dimensional CAD system, and outputs its result. Therefore, an automatic acquisition program for the three-dimensional CAD information is created, and two kinds of processing of acquiring information are conducted. One of them is acquisition 201 of component attribute information and hierarchical relation. The other of them is acquisition 202 of component arrangement information.

After the processing of acquisition 201 of the component attribute information, definition editing of assembly sequence and definition setting 121 of assembly operation on components are conducted on component attribute information and hierarchical relation automatically acquired from the three-dimensional CAD system. Furthermore, workshop setting 122 is conducted to specify an assemble workshop in which this assemble work is to be executed. The component assembly operation is represented by a combination of preset standard assembly operations. For example, operation of downward movement is represented by a symbol ↓, and operation of screw rotation is represented by a symbol Q, whereas press fitting operation is represented by a symbol C. With respect to these standard assembly operation symbols, the "assembly time coefficient" and the "assembly defect coefficient" are previously set in an assembly time evaluation database 411 and an assembly defect evaluation database 412, respectively. Assembly time 51 and assembly fraction defective 52 are estimated by referring to data set in these databases.

By acquiring component arrangement information 202 in the product structure from the three-dimensional CAD system 21, and acquiring a signal transmission route 203 in the two-dimensional CAD system 22 or an electric circuit diagram, a route 204 on which components are interrelated is calculated. This route on which components are interrelated can be used for evaluation as a route for propagating a defect influence when a component defect has occurred. In addition, a basic function is defined for each component, and the calculated defect influence propagation route is represented in a drawing by using basic functions. The term "defect" means losing a function, and the drawing becomes a function relation diagram as well. This function relation diagram becomes a representation showing whether a requested function is satisfied and showing design problems put in order. The function relation diagram can be used as an index of design improvement.

Subsequently, by using the assembly time estimation result 51, the assembly defect estimation result 52 and the defect influence propagation route 211 of the component, and by setting an inspection process and a position for confirmation work in the process flow as process design information, defect influence degree evaluation 250 is executed.

In the defect or failure mode analysis, the analysis is conducted as follows in general (for example, in the FMEA analysis). First, components, their functions and failure modes are enumerated. And an occurrence frequency, influence degree and detection degree of each failure mode are set by using an evaluation scale of 1 to 10 or 1 to 5, on the basis of the evaluator's experience. And as evaluation of fatality degree of a failure mode, (occurrence probability of the failure mode)×(influence degree of the failure mode)×(detection degree of the failure) is evaluated. In this way, the fatality degree according to the evaluator's scale is determined.

In the present invention, quantitative evaluation of the influence degree of a defect is aimed at. In the present embodiment, the degree of difficulty in disassembly repair, i.e., the time and cost required since finding of an assembly defect until disassembly and repair are calculated, and the influence degree of a defect is quantitatively evaluated. In other words, an inspection process is set after a certain process. If a defect of a component finished in assembly work several processes before the inspection process is found as a result of the inspection, disassembly work is conducted in order to remove the found defective component and then assembly work is newly conducted. Thus, the time required since finding of an assembly defect until disassembly and repair, and the cost required for its countermeasure are calculated. In other words, the time and cost are quantitatively evaluated on the basis of the relation degree of the component that exerts influence upon subsequent processes when an assembly defect or a component defect has occurred.

As for the "disassembly time coefficient" and component cost concerning the disassembly operation at this time, a disassembly repair time evaluation database 413 and a cost evaluation database 414 previously set are referred to. In the present embodiment, estimation of the disassembly time is similar to the estimation of the assembly work time. Basically, calculation is executed by regarding operation opposite to the assembly operation set at the time of assembly as disassembly operation. Definition of operation dedicated to disassembly is not conducted. In many cases, however, component handling is easier in disassembly operation than assembly operation. Therefore, it is also conceivable to use a "disassembly time coefficient" instead of the "assembly time coefficient" defined for assembly operation. As for assembly work for which disassembly cannot be conducted easily, such as welding, soldering and binding, however, they are previously stored as assembly work that does not allow disassembly in the disassembly repair time evaluation database, and for disassembly work of the component subjected to the assembly work, a decision that the component is a component that cannot be disassembled is output. On the basis of the decision result that the component is a component that cannot be disassembled and the relative route of that component, a range up to a component that can be disassembled is handled as a one-body subassembly, and time required to remove the subassembly is calculated. In addition, a component cost required when the subassembly is newly arranged and time required to newly conduct assembly work are calculated with reference to the cost evaluation database 414 and the assembly time evaluation database 411, and the sum total value of them is output as the disassembly repair time and cost. Besides the evaluation of this disassembly repair time, the degree of fatality caused by influence at the time of a defect occurrence is evaluated by using the assembly fraction defective and component failure rate.

Owing to this defect influence degree evaluation 250, not only the assembly fraction defective of each component, but also the time and cost required for countermeasures taken when an assembly defect has been found, and influence exerted on defect occurrence when a process has been altered can be grasped. Importance 51 of components and process is evaluated. Furthermore, at the same time, time and cost required for assembly, time and cost required for inspection, and a cost required for taking countermeasures against a defect are calculated (255). Furthermore, a function relation diagram is generated on the basis of the basic function defined for each component and the generated defect influence degree propagation route of the component, and design improvement is supported by displaying this relation diagram. Furthermore, a defect phenomenon is expressed clearly to the designer as a loss of a basic function, and a list of defect factors is exhibited in a hierarchical form on the basis of the relation diagram. By thus making the most of the evaluation result, product design and process design with high quality are conducted.

(4) Concrete Examples of Component Attribute Information Acquisition Processing and Component Arrangement Information Acquisition Processing A concrete example of acquisition of component attribute information from the three-dimensional CAD system and a concrete example of acquisition of component arrangement information from the three-dimensional CAD system will now be described.

A concrete example of acquisition of component attribute information from the three-dimensional CAD system and a concrete example of acquisition of component arrangement information from the three-dimensional CAD system will now be described with reference to FIGS. 4 to 8.

Figure 4:
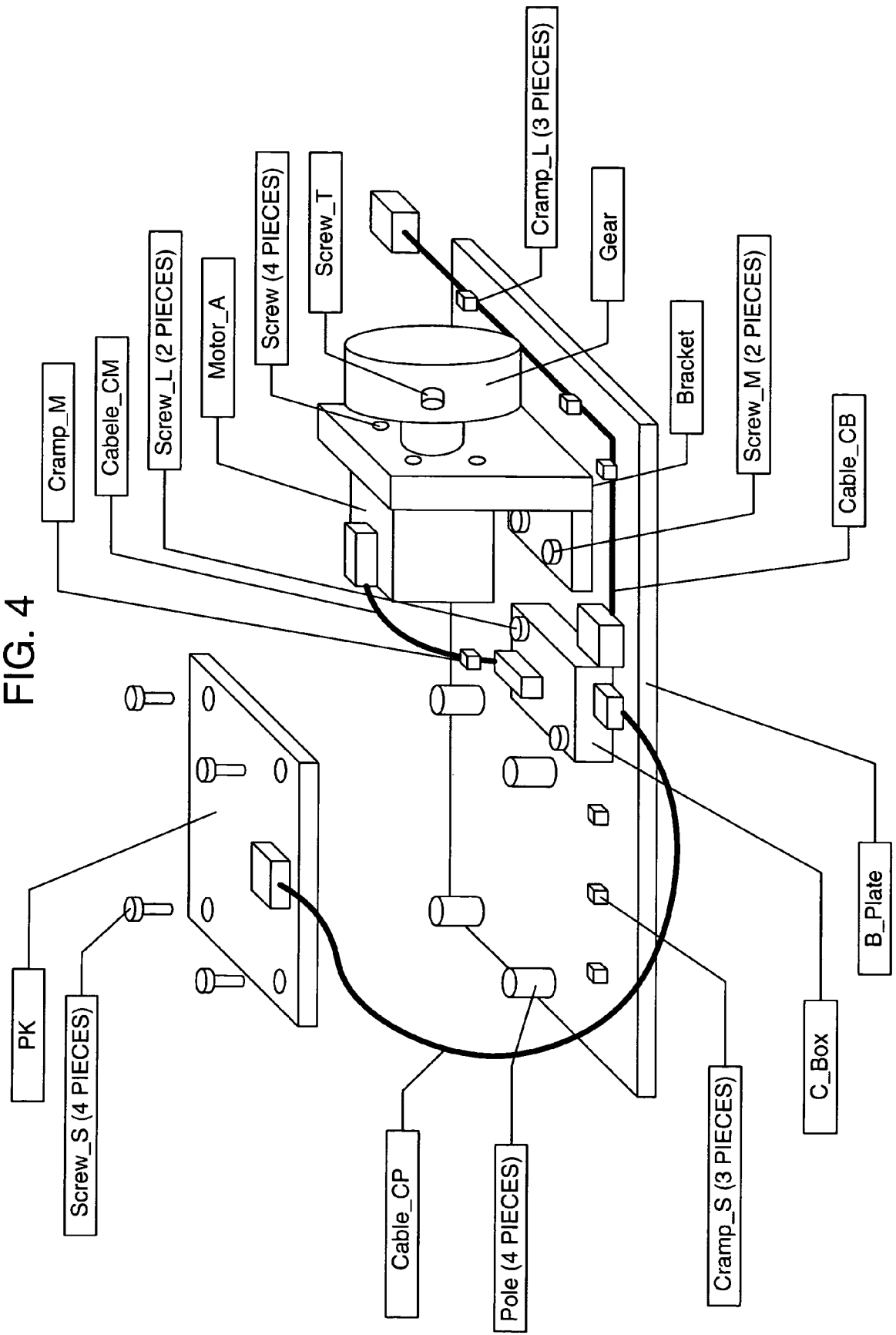
FIG. 4 is an oblique view of a product example showing an embodiment.

FIG. 4 is an oblique view of a product used as an example.

Figure 5:
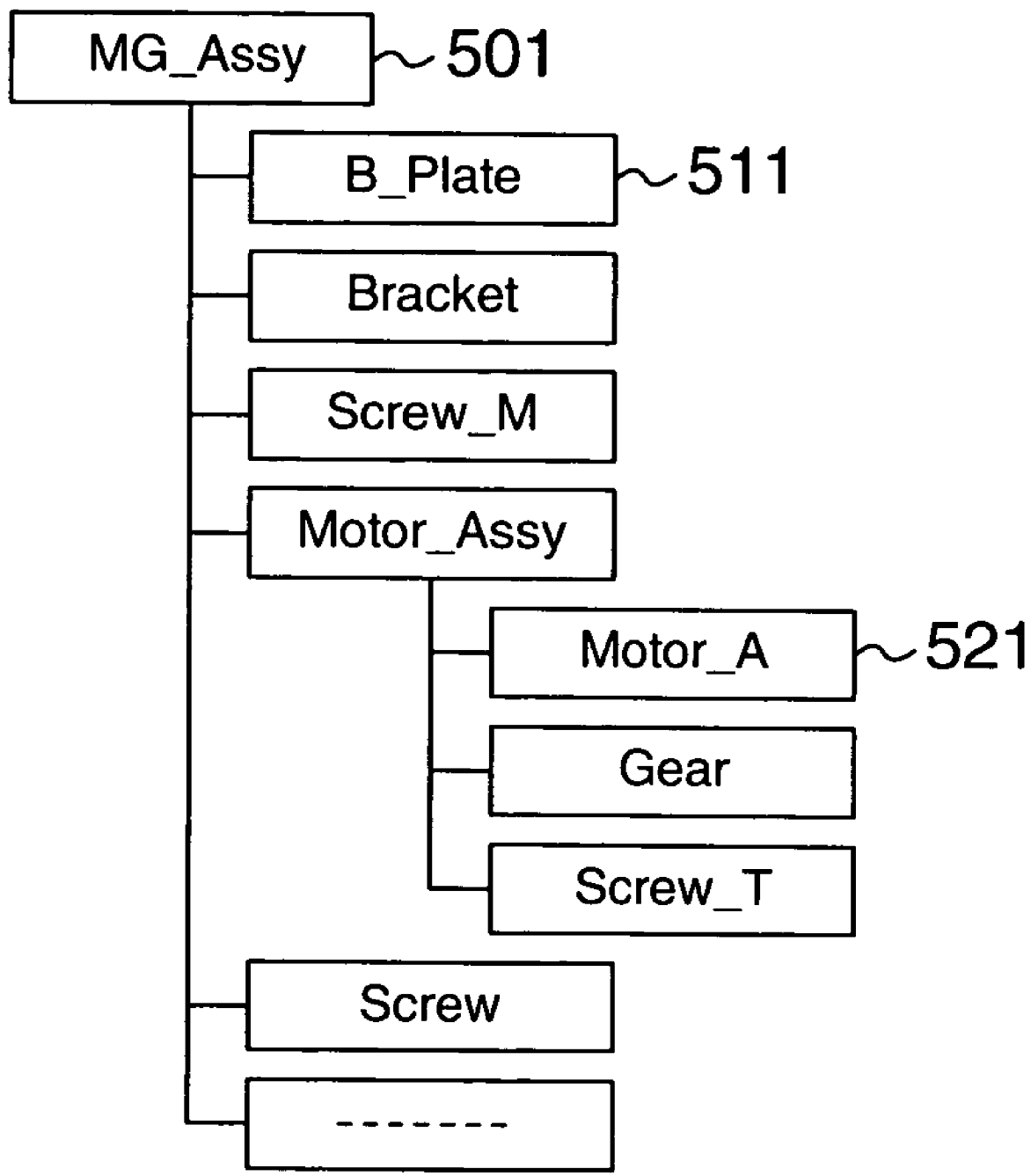
FIG. 5 is a diagram showing a component configuration acquired from a three-dimensional CAD system.

FIG. 5 is a component hierarchy diagram showing a component configuration acquired from the three-dimensional CAD system in the concrete example shown in FIG. 4. FIG. 6 is an example of a component attribute table showing component attributes acquired from the three-dimensional CAD system in the concrete example shown in FIG. 4.

FIG. 7 is an example of a component constraint information table showing mutual constraint information among components acquired from the three-dimensional CAD system in the concrete example shown in FIG. 4.

FIG. 8 is an example of a component contact information table showing mutual contact information among components acquired from the three-dimensional CAD system in the concrete example shown in FIG. 4.

Prior to description of information acquisition processing, summary of the three-dimensional CAD system will be described briefly. When inputting (112) mechanical design information to the three-dimensional CAD system and conducting modeling, each of components, subassemblies and assemblies is provided with a modeling file name. Besides this modeling file name, a component name is defined in some cases. In description of the present embodiment, the modeling file name or the defined component name is defined as a component name in a product. Furthermore, when creating one assembly model, an arrangement relation is defined as a constraint condition between a component and another component. Herein, the "constraint condition" means definition information when arranging components, such as a certain surface of a component B is aligned with a surface of a component A, a surface and another surface are parallel in positions 50 mm apart, or a central axis of a cylinder and a central axis of a long hole are concentric. When creating an assembly model of the three-dimensional CAD, the component can be disposed in a predetermined position by defining this constraint condition. The definition of the constraint condition for a component has been described. However, it is also possible to handle a created assembly as one subassembly component, and define and dispose the created assembly by using a constraint condition with respect to a higher rank assembly model.

The design work using the three-dimensional CAD is advanced while conducting arrangement work of components in the assembly model together with the modeling work for creating shapes of components. While conducting this design work, attribute information is defined for each component in order for the designer to grasp the function of the model and use it in creation of an actual order drawing or a written work order. This component attribute information includes a component number and a component material besides a component name. Furthermore, in the design study work, calculation of the volume of the model and interference check are also conducted. It is also possible to calculate the mass on the basis of a result of the volume calculation and a result of material setting, and provide a component with a comment, such as matters to be attended to in assembly, as a note.

The interference check function and the disassembly state setting function are included in the functions of the three-dimensional CAD system.

The interference check function includes, for example, the following two functions. One of the functions is a function of displaying a volume of an interfering portion besides displaying a combination list of interfering components in a preset component range. The other of the functions is a function of setting a predetermined clearance value, and displaying a combination list of components having a gap which becomes equal to a clearance value or less, between components.

The disassembly state setting function is a function for studying the assembly method and the disassembly method, and a written assembly order can also be created by using a view in which a component is disassembled in an arbitrary direction. This disassembly state setting function can be recorded in model data as a disassembled state by moving a component from the assembly state in an arbitrary direction. In this disassembly state, a plurality of kinds can be set, and a plurality of disassembly states can also be recorded for, for example, each operation step of disassembly.

The information defined in the three-dimensional CAD model and information that can be calculated by using the function of the three-dimensional CAD system can be automatically calculated by using a customize tool of the three-dimensional CAD, and acquired as data.

FIG. 4 is an oblique view of a product used as an example. This product has a model name MG__Assy. In this oblique view, a PK, a Screw__S and so on are in a partially disassembled state. In a state after assembly, the PK is in contact with Poles, and fastened to the Poles by Screw__S. By regarding FIG. 4 as one three-dimensional CAD model, a concrete example will be described.

FIG. 5 is a diagram showing a component configuration acquired from the three-dimensional CAD system in the concrete example shown in FIG. 4. Typically in the model hierarchy diagram of the three-dimensional CAD, components and subassemblies 511 and 512 are thus displayed in a hierarchical form under the product name 501MG__Assy of the highest rank. For each of the components, its hierarchy number is stored. For example, as shown in FIG. 5, a subassembly Motor__Assy is placed under MG__Assy, and Motor__A is placed under the subassembly Motor Assy. In the three-dimensional CD, a hierarchical level is the unit at the time of modeling, and a configuration with attention especially paid to assembly work is not adopted in many cases. The reason is that hierarchy levels are created with the units used when creating constraint conditions and subassemblies arranged in the assembly model.

FIG. 6 shows an example of a component attribute table obtained by acquiring component attribute information concerning the three-dimensional CAD information. In the example shown in this table, a hierarchy level number, a component name (model name), a component number, the number of components, a parent component name, a parent component number, a material, a mass, a maximum dimension, an assembly direction and matters to be attended to. As for the hierarchy level number, the component name, the number of components, and the maximum dimension, information can be automatically acquired. As for other information, information can be automatically acquired as component information if the designer has previously input the information to the three-dimensional CAD system.

As for the maximum dimension of the component, a bounding box (a rectangular solid bounding the model) is calculated by using the function of the three-dimensional CAD, and thereby maximum dimension of the rectangular solid are acquired as the maximum dimension of the component. Furthermore, by setting one or more disassembly states by means of the function of the three-dimensional CAD system as described above, the assembly direction of each component can be acquired on the basis of a difference between model coordinates obtained before the disassembly and model coordinates obtained after the disassembly. Numerical values in the assembly direction shown in FIG. 6 show a vector of (X, Y, Z). By thus defining at least one disassembly state, one direction in the assembly direction can also be automatically acquired.

The result of acquisition of the component attribute information from the three-dimensional CAD system can be utilized as component attribute information 201 required when evaluating the assembly time estimation 51 and assembly defect estimation 52 shown in FIG. 3.

FIG. 7 is a component constraint information table showing mutual constraint information among components acquired from the three-dimensional CAD system in the concrete example of FIG. 4. As described above, constraint conditions of components are defined when creating the assembly model. A result of acquisition of the defined information is shown in the table shown in FIG. 7. For example, in a component B_Plate and a component Bracket shown in FIG. 7, surfaces (SFs) are constraint conditions of "alignment (ALIGN)." As other constraint information, there are "coincidence in offset dimension (MATE_OFF in FIG. 7)", "coincidence (MATE in FIG. 7)", "tangent relation", "coincidence on line", "coincidence on point", and so on. Furthermore, an axis (AXIS), a point, an edge can also be defined besides a surface (SF) as kinds in the constraint portion, and their information can be acquired. Furthermore, with respect to components for component constraint information shown in FIG. 7, all component attributes can be referred to on the basis of the component name in the component attribute information table shown in FIG. 6.

FIG. 8 is a component contact information table showing mutual contact information among components acquired from the three-dimensional CAD system in the concrete example shown in FIG. 4. In the three-dimensional CAD system, the interference function can be automatically executed by a program created by using the customize tool, as described above. As a result of the interference check, mutual contact information among components can be acquired as shown in, for example, FIG. 8. In FIG. 8, a result of execution of an interference check with the clearance value set equal to 0 is shown. A row having interference information on the left side of the table indicated as 0 is a component disposed with a clearance value of 0 or less. In other words, the row having interference information on the left side of the table indicated as 0 represents a combination of components in contact. A row indicated by an abbreviation INTF is a component that is interfering even in a part. If design is conducted correctly, it is considered that there is no interference between components. Taking it into consideration to utilize the model data in the next process, i.e., in the component working, it is typical that interference information remains in the assembly data. For example, the B_Plate is subjected to tapping working, and screws are inserted into holes formed in the Bracket to fasten them. In a three-dimensional CAD model of the B_Plate in this configuration subjected to prepared hole working and then tapping working, the prepared holes are modeled in diameter. Data in this state are utilized in component working serving as the subsequent process. In screw fastening, therefore, female screw working portions interfere. Furthermore, components that conduct fixing by elastic deformation, such as E snap rings and C snap rings, also interfere in fastening portions in the same way. In this way, especially in fastening components such as screws and snap rings, fixing components having female screws and grooves worked thereon are brought into the interfering state, and the component and a component fixed by the fastening components are brought into the contact state.

By thus putting the component constraint information and the component contact information described with reference to FIGS. 7 and 8 in order and using a result as the component arrangement information 202, the interrelation route among components 204 can be calculated and the component defect influence propagation route can be calculated. If at this time there are data such as electrical design information and other component function relation diagrams besides the mechanical design information of the three-dimensional CAD system, then the interrelation route among components 204 may also be calculated as information with the interrelation route among components added.

(5) Calculation of Interrelation Route Among Components

Calculation of interrelation route among components will now be described.

Figure 9:
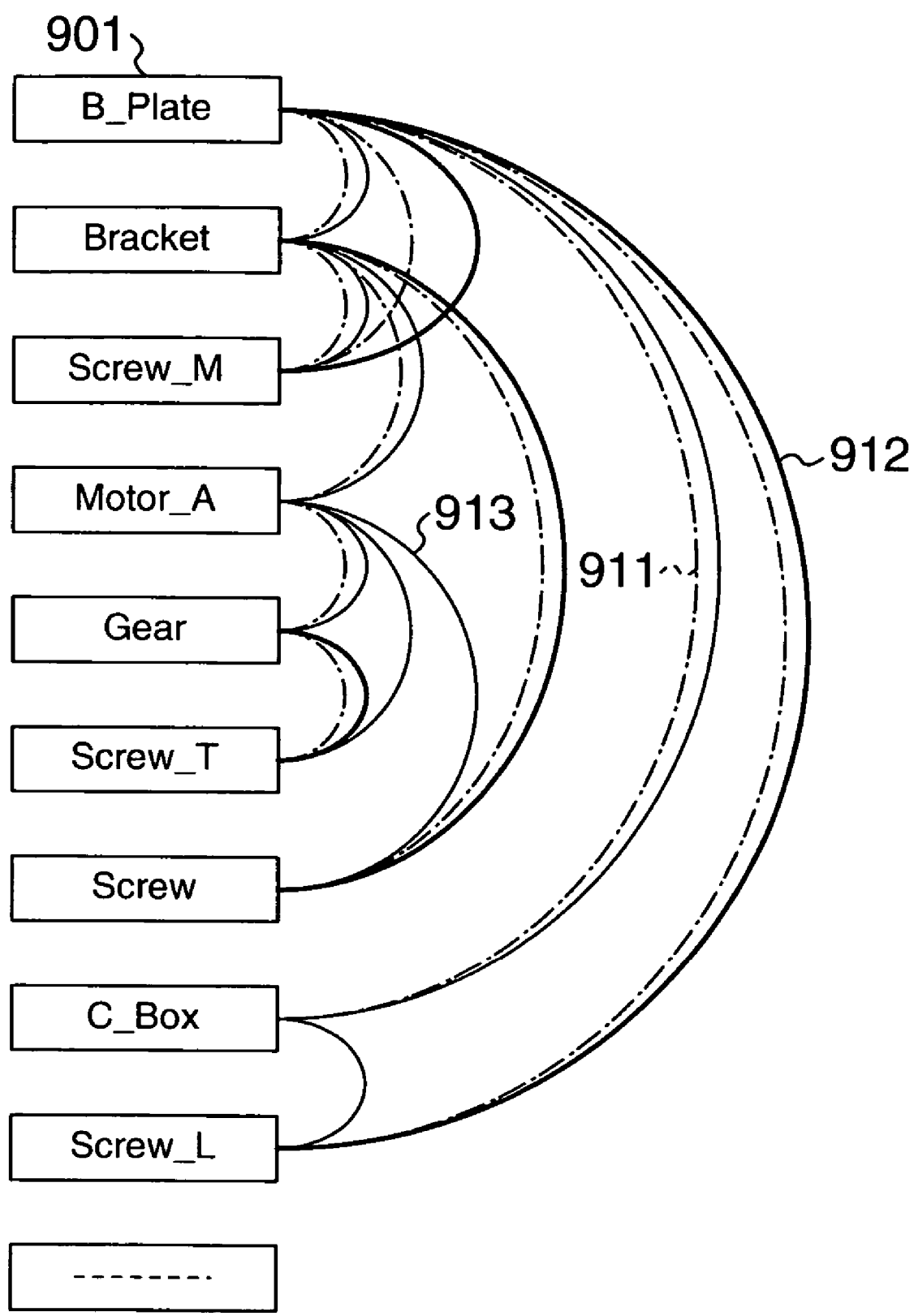
FIG. 9 is a component arrangement information diagram showing component constraint information shown in FIG. 7 and component contact information shown in FIG. 8 in a relation diagram.

FIG. 9 is a component arrangement information diagram showing the component constraint information shown in FIG. 7 and the component contact information shown in FIG. 8 by using a relation diagram.

In FIG. 9, frames located on the left side indicate component names 901. Lines drawn on the right side of the frames show relations to other components. In FIG. 9, a thick solid line 912 represents a relation having an interference portion and a thin solid line 913 represents a contact relation, whereas a dot-dash line 911 represents a relation in which a constraint condition is set. For more detailed representation, the line kind and the line thickness may be changed in display every constraint condition and interference volume.

In FIG. 9, a relation having an interference portion is considered to be a state in which fastening female screws have been worked, and the relation having interference is considered to be the strongest and the most important relation and represented by a thick solid line. Owing to this diagram, the interference relation, contact relation and constraint relation among components can be watched at a time. Furthermore, it is possible to grasp the influence range when a component problem has occurred and, on the contrary, analyze the factors. In addition, the defect influence degree can be evaluated by using the interrelation route among components 204 together with the fraction defective estimation results of components as described with reference to FIGS. 1 and 2.

In the foregoing description, output information of the three-dimensional CAD system is utilized as the product design information. As another method, however, the component attribute information and the component arrangement information may also be acquired from data reduced in weight by using model data of the three-dimensional CAD system as viewer model information. Furthermore, there is a tolerance analysis program for analyzing the tolerance with respect to the product structure created in the three-dimensional CAD system, and the assembly sequence is set at the time of analysis. At the time of assembly sequence setting, a method of automatically acquiring an assembly sequence set by another analysis program may be used.

(6) Definition and Utilization of Basic Functions for Components

A method for defining the basic functions for components and a method for utilizing its result will now be described.

FIG. 10 is a basic function setting table showing an example of basic function setting for components in an embodiment of the present invention.

In this example, a basic function 1 and a basic function are set for each of components shown in the table. As the basic functions, a list of the basic function 1 representing large groups, such as holding, fastening, transmission, signal transmission, a motor, and a sensor, is defined. In addition, a list of the basic function 2 of small groups for the large groups is defined as occasion demands. For example, as for the fastening, screw fastening, snap ring fastening, press fitting and so on are previously set in the list of the basic function 2. Basic functions are defined for each of the components by selecting basic functions from the list of the basic function 1 and the list of the basic function 2, which were previously set. If input information is increased, however, the burden on the designer also increases. Furthermore, if the group becomes small, information cannot be arranged and it becomes difficult to utilize the information. Therefore, it is not necessary to increase group items, but only the basic function 1 may be defined. Furthermore, as evident from FIG. 10, there are relations between component names and basic functions in many cases. The reason is that the concept of the basic function is contained in the component name designated by the designer. Therefore, the basic function may be defined when component attribute information has been acquired, by, for example, previously creating a reference table for automatically acquiring a basic function from the component name and referring to the basic function name table. For example, in the basic function name table, a component including "Screw" in its component name has a basic function 1 of "fastening" and a basic function of "screw fastening," and a component including "Gear" in its component name has a basic function 1 of "transmission" and a basic function of "rotational transmission." In this way, the basic function input 115 shown in FIG. 3 can also be automatically acquired at the time of the acquisition 201 of the component attribute information by referring to the basic function name table.

(7) Design Support Provided by System

Design support conducted by utilizing the basic functions defined for components (FIG. 10) defined for components and the component attribute information and the interrelation route among components shown in FIGS. 6 to 9 will now be described.

Figure 11:
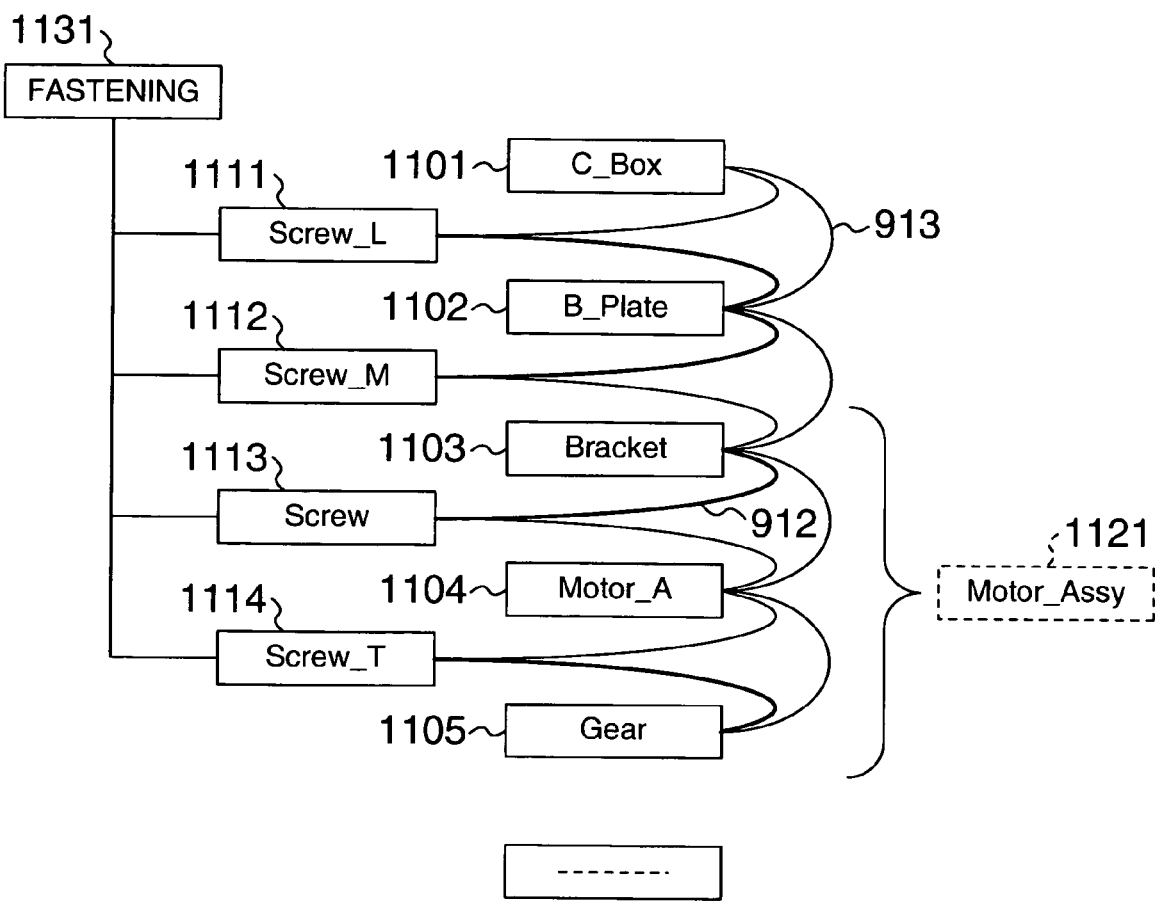
FIG. 11 is a component hierarchy diagram obtained by changing a component hierarchy diagram shown in FIG. 5 while taking assembly as a unit.

First, the attribute of the basic function "fastening" is designated as a parent component, and hierarchy display is conducted as shown in FIG. 11. As a result, interrelation routes among components can be displayed with respect to each of components assembled by "fastening." The component sequence in the relation diagram shown in FIG. 9 is rearranged so as to prevent lines indicating the relation information from intersecting. As a result, relations among components linked by the relation of the basic function "fastening" can be grasped at a glance. In the assembly work, subassembling is important in order to facilitate parallel works as well. However, subassembling is helpful to the study support as well. For example, one subassembly Motor_Assy can be defined by removing the fastening relation of Screw_M shown in FIG. 11.

Figure 12:
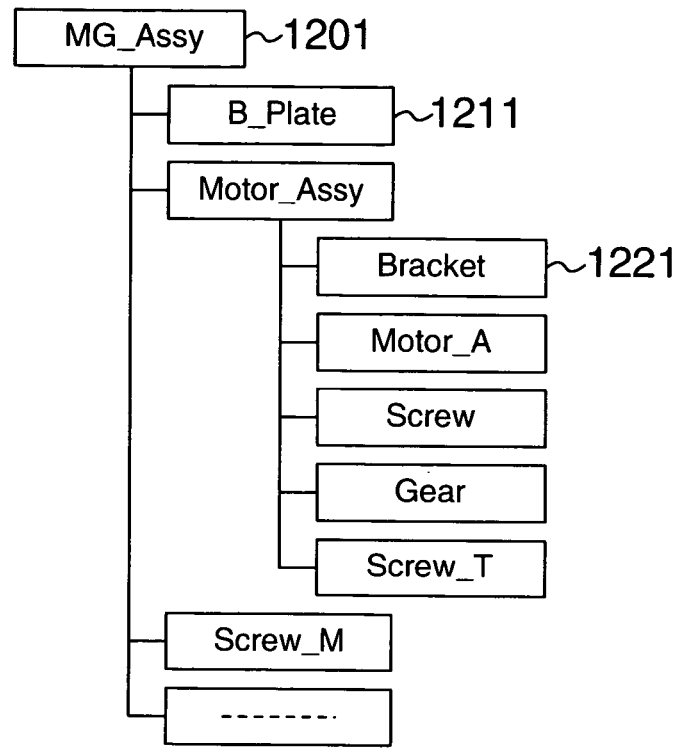
FIG. 12 is a component arrangement information diagram showing relations among fastening components and other components with respect to a component arrangement information diagram shown in FIG. 9.

Owing to this calculation result, the hierarchy can be re-edited into a hierarchy facilitating assembly as shown in FIG. 12. It will be appreciated that the hierarchy diagram shown in FIG. 5 (hierarchy automatically acquired from the three-dimensional CAD system) is the hierarchy at the time of modeling, whereas the hierarchy diagram shown in FIG. 12 (the hierarchy edited on the basis of the basic function definition and the interrelation diagram among components) is the hierarchy at the time of assembly. The display method shown in FIG. 11 has been calculated by replacing the parent component name with the attribute of "fastening" and display can be conducted easily. In this way, it is possible to conduct the design support at the time when altering the assembly unit (alteration of the hierarchy diagram) and grasp the interrelation among components when arrangement has been conducted with the same basic function.

Figure 13:
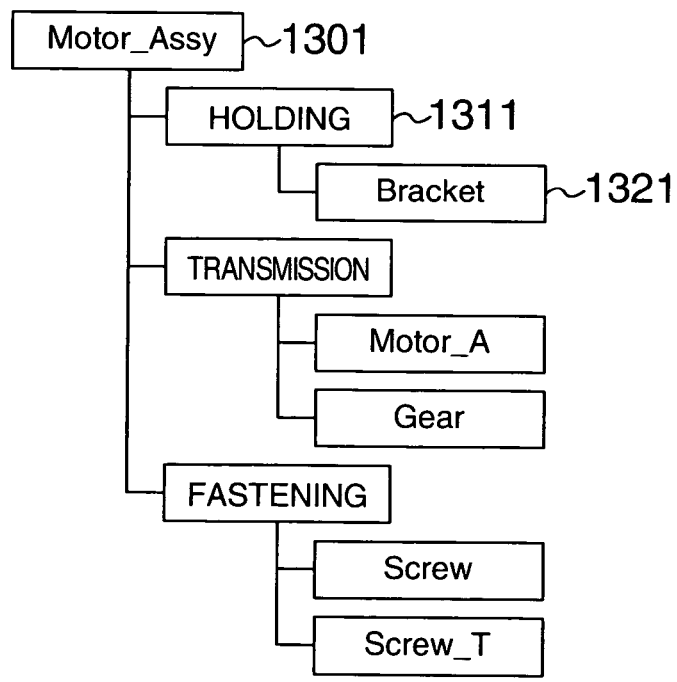
FIG. 13 is a basic function hierarchy diagram for a product example showing an embodiment.
Figure 14:
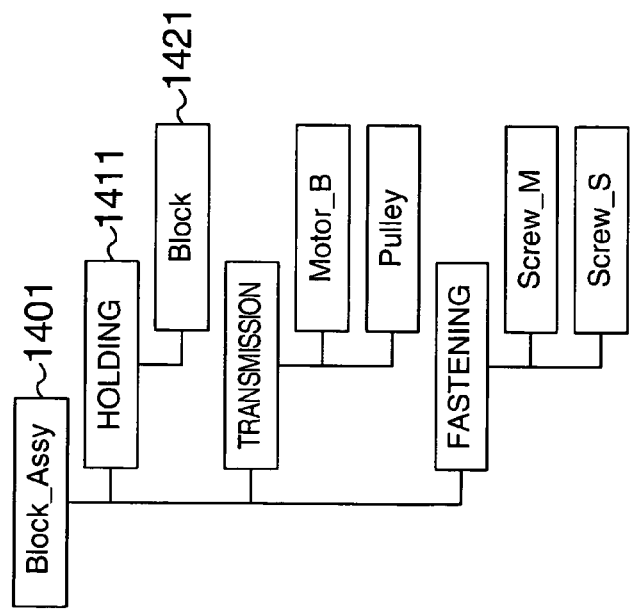
FIG. 14 is a basic function hierarchy diagram for a past product having a basic function hierarchy diagram similar to FIG. 13.

A utilization example of a basic function hierarchy diagram with components classified on the basis of the basic functions will now be described with reference to FIGS. 13 and 14. FIG. 13 is a basic function hierarchy diagram according to the present invention obtained by classifying components in a part of the concrete example shown in FIG. 4 on the basis of the basic function. FIG. 14 is a basic function hierarchy diagram of a past product having a basic function hierarchy diagram similar to that shown in FIG. 13. For example, a product (or subassembly) represented by Motor_Assy in FIG. 13 is formed of a combination of the basic functions "holding," "transmission" and "fastening." For reference of the design know-how in this configuration, past design instances can be referred to. Its example is FIG. 14, and it is a result obtained by retrieving an example having a combination of the same basic functions. FIGS. 13 and 14 are different in component names, but they are the same in combination of functions. On the basis of the retrieval result, the past design know-how and defect instances can be referred to by referring to design information having the same combination of basic functions. It is also possible to study the design information as an alternative plan. In addition, in advancing the design work, it is studied in many cases to maintain the cost while adding a function. In such a case, however, frequently a product kind under development cannot be simply compared with a past product kind. If at this time the past product kind is compared with the product kind under development by using a function hierarchy diagram and a state restricted to the same function is set, then the cost comparison and comparison of the fraction defective can be conducted under the same function condition.

Figure 15:
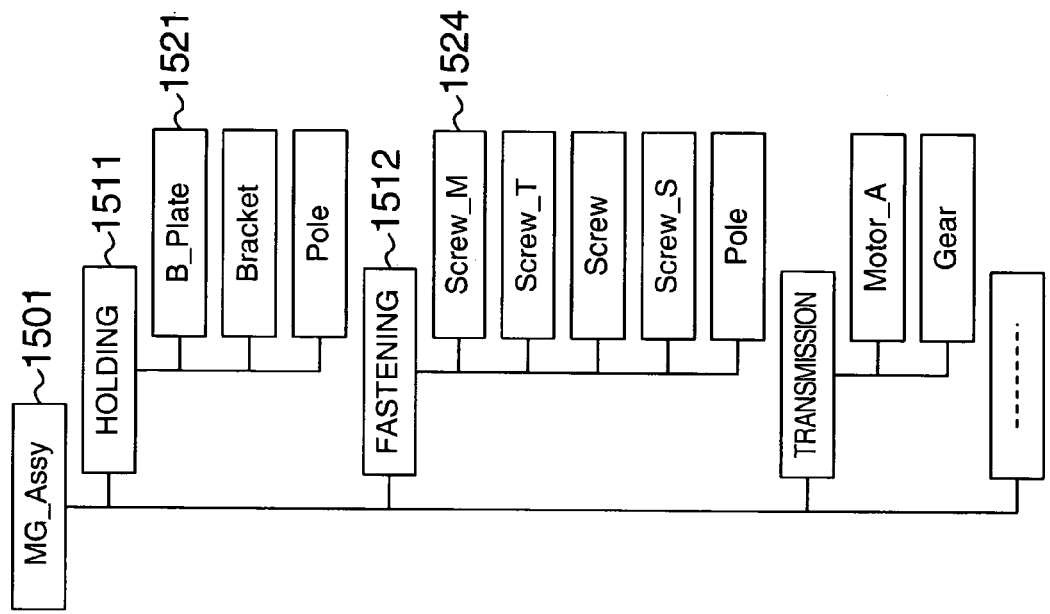
FIG. 15 is a basic function hierarchy diagram of the present invention obtained by classifying components according to basic functions with respect to a product example showing an embodiment.

FIG. 15 is a basic function hierarchy diagram according to an embodiment of the present invention obtained by classifying components on the basis of the basic function in the concrete example shown in FIG. 4. By thus conducting hierarchical classification on the component configuration every basic function, it becomes easy to study integration of components having the same function and reduction in the number of kinds of components of different kinds having the same function. For example, the basic function hierarchy diagram can also be utilized as a support for design study, such as study of integration of B_Plate, Bracket and Pole having the basic function of "holding" and reduction in kinds of screw components having the basic function of "fastening." In the assembly work, reduction of the number of components and reduction of component kinds have a great effect in reduction of the assembly time and reduction of defects. Therefore, the design improvement can be conducted efficiently by utilizing the basic function hierarchy diagram and the defect influence degree evaluation method in an interlocked way.

(8) Output Example of Evaluation Results

An output example of evaluation results will now be described.

FIG. 16 shows an output example of evaluation results in an embodiment of the present invention.

In FIG. 16, the product design information, the process design information and the component arrangement information are put together in a table form, and in addition, results of calculation of the component importance and process importance are output. It is based on the dual table form of QFD (Quality Function Development). In FIG. 16, one of feature points is that component interrelations are shown in a table area 202 where component information 1601 to 1604 in the product design information 111 intersects work information 1622 in the process design information 122. The calculation of component interrelations has already been described in (4) with reference to FIGS. 7 and 8. It is also a feature that a disassembly repair cost 255 at the time of defect finding with presence or absence of an inspection process taken into consideration and with presence or absence of confirmation using inspection reflected is calculated and displayed. It is the most prominent feature to calculate a degree of importance 253 of a component and a degree of importance 252 of a process on the basis of calculated various numerical values, represent them quantitatively, and display them.

(8.1) Product Design Information 111

Hereafter, items shown in FIG. 16 will be described.

First, the product design information 111 shown on the left side will now be described.

Along a longitudinal axis on the left side of the table, information concerning components included in the product is displayed in the order of component configuration (in the order of hierarchy diagram edited by taking component assembly as the unit) together with the product design information handled by the product design department. As for the design information 111, the number of components 1602 is displayed for each of product components 1601. A component failure rate 1603 is set when taking the occurrence frequency of failures found after the assembly, such as working defects and failures of component themselves, into consideration besides defects in the assembly work. As for the component failure rate 1603, it is possible to use a method of arranging past component defect examples by using function classification, storing the arranged past component defect examples in a defect instance reference database, and referring to the defect instance reference database. It is also possible to use a method of setting component failure rates for only components to be attended to. As for a component cost 1604, costs such as a component working cost or a purchase price are read from a database and displayed. This information can be utilized when the designer grasps the balance between the component working cost and assembly cost. This is used as a value for cost conversion when conducting component exchange upon occurrence of an assembly defect. As for this component cost 1604, it is possible to use a method of previously preparing a component cost reference table, referring to the table on the basis of a component name or a component number, and acquiring data. Values of assembly time and assembly fraction defective shown on columns located on the right side of the component cost 1604 are estimation results calculated from the assembly time estimation 51 for each assembly component and fraction defective estimation 52 for each assembly component described with reference to FIG. 2. These are results output by executing a calculation program after the inputting 121 of the design information such as the assembly sequence and assembly operation has been conducted. As for the estimation results of the assembly time and assembly fraction defective shown along the longitudinal axis in the same way as the product design information, however, standard values are used as coefficients of the workshop condition (a coefficient of assembly speed and a coefficient of assembly fraction defective according to a difference in workshop), and a result of calculation using factors affecting the product design is displayed. As a result, the product designer can pay attention to this information and improve the product design. Although the assembly time has been displayed here, an assembly cost obtained by multiplying the assembly time by a standard wage rate may also be displayed at the same time.

(8.2) Process Design Information 122

Display contents of the process design information 122 will now be described.

(8.2.1) Display Items of Process Design Information 122

Here, a process 1621 indicates a division for each assembly unit. In this example, the process is divided into Motor_Assy (subassembly) and MG_Assy (general assembly). A work 1622 located under the process 1621 indicates the process flow and the work sequence. In one process division, work is conducted in order from the leftmost end. The display of the process and work is obtained by extracting assembly units from the product design information and conducting automatic conversion and rearrangement so as to dispose a lower hierarchy level on the left side and dispose in the order of ascending hierarchy level. Here, an assembly work shop is set for each division of process. For example, a workshop condition coefficient (a coefficient of assembly speed and a coefficient of assembly fraction defective based on a difference in workshop) is set as in the example of a preset workshop coefficient 1623. Here, A: (1.0, 1.0, 1.0) is a standard workshop. In the case of C: (0.8, 1.5, 0.7), the assembly speed coefficient is 0.8 times as large as its standard coefficient and the assembly defect coefficient is 1.5 times as large as its standard coefficient. Furthermore, the wage rate is 0.7 times as large as the standard wage rate. In the workshop, therefore, the assembly speed is faster, but more defects tend to occur and the assembly work cost is lower, as compared with the standard workshop. As for the workshop coefficient, it is possible to use a method of previously investigating workshops, creating a database having combinations of the workshop name and the workshop coefficient set therein, and reading the workshop coefficient by selecting a workshop name. By this workshop setting, therefore, the estimation results of the assembly time, the assembly cost and the assembly fraction defective change. The assembly time and the assembly fraction defective are displayed under the row of the work 1622, and they are results obtained by conducting calculations using the set workshop coefficient 1623. The values are values obtained by conducting correction calculations on the evaluation results along the longitudinal axis in the product design information, with the workshop coefficients.

(8.2.2) Assignment of Inspection Processes

Furthermore, when conducting the process design, it is set whether assembly confirmation work is present, and positions on the flow where an inspection process and a function test are to be conducted are set. This process design information is information newly set here. The process design is conducted by executing addition and alteration with reference to the output results. A form in which separately defined process design information is read may also be used.

(8.3) Area on Table Where Component Information in Product Design Information and Work Information in Process Design Information Intersect An area on the table where the component information in the product design information and the work information in the process design information intersect will now be described.

An area 202 on the table where the component information in the product design information and the work information in the process design information intersect indicates an interrelation diagram among components. The area 202 indicates an interrelation diagram among components based on the assembly sequence, i.e., a defect influence propagation route. In the example shown in the diagram, a double circle (◎) represents a component and work to be assembled. With respect to relating higher rank components (already assembled components) at that time, component arrangement information is displayed with symbols. Besides, a circle (○) represents a component in contact, and a black rhomb (◆) represents an interference component (a component having a female screw or a groove) in a fastening component.

Information of components in contact and information of interfering components are displayed. There is a case where it is necessary to provide a relation although there is no contact on the three-dimensional CAD model. For example, there is a case where there are a component that moves as a basic function and a flexible component that is difficult to be fixed. If this moving component and the flexible component are arranged in a predetermined dimension range, it can be estimated that the possibility of making a contact is high depending on the quality of the assembly work. Therefore, the preset basic function is referred to. For example, in acquisition of component arrangement information concerning the "transmission" and "signal transmission" (such as cable or wiring) in the basic functions, the clearance is provided with a predetermined value. If the clearance is calculated to be less than the preset clearance value, the components are stored and displayed as components that are apt to come in contact with each other. As an example, in the work of Cable_CB, a calculation result indicating that it is apt to come in contact with Gear is displayed by a triangle (△). As for the clearance value setting, it may also be set at the time of calculation. However, a value calculated from the section dimension in the model dimension may also be used. Furthermore, it is possible to prepare a setting table for a preset component name, a basic function name, and a clearance value, and refer to information included in the table.

In FIG. 16, components to be inspected in an inspection process set as a process are represented by a square (□). By this process design, not only the inspection process position, but also components to be subject to confirmation work are set. As a result, a correction calculation for reducing the coefficient of the fraction defective after the confirmation work can also be conducted.

(8.4) Disassembly Repair Cost 255 at the Time of Defect Finding

A calculation method for the disassembly repair cost 255 at the time of defect finding will now be described.

In the work sequence set as the process design information, there are inspections other than the assembly operation, such as confirmation work, function tests and inspections before shipping. The embodiment of the present invention has a feature that time required to find a defect at the time of this inspection work, conduct disassembly work for removing a defective component, and newly conduct assembly work, and a cost required for taking its countermeasure are calculated. In addition, its result is displayed in a column of a disassembly repair cost 255 at the time of defect finding.

This example will now be described by taking B_Plate. It is supposed that when a defect in B_Plate is found at the point in time of work name "confirmation work" in the process name "MG_Assy," all components assembled to the B_Plate are disassembled once, the B_Plate is replaced by a new component, and then all components are assembled and "confirmation work" is conducted again. The time and cost for the work are calculated. First, components related to the B_Plate are extracted from the interrelation diagram among components, and assembly operations of respective components are checked in a disassembly prohibiting operation table in the disassembly repair database. Operations and components that can be disassembled are thus extracted. On the basis of this result, disassembly operations calculated inversely from the assembly operations are generated, and disassembly time is calculated. The disassembly time and the assembly time are multiplied respectively by wage rates. A cost required when defective components are newly prepared is added. A result is displayed on a "confirmation work" column in the "B_Plate" row as the disassembly repair cost at the time of defect finding. In the same way, results calculated for all components in the product configuration are displayed. It is thus possible to evaluate the degree of difficulty of a countermeasure to be taken when a defect has been found at the preset point in time of work.

This result can also be utilized effectively as evaluation of the maintainability and evaluation of recycling ability. For example, a structure facilitating taking out components having a short life and articles of consumption should be used. A configuration in which they can be taken out without removing other components is desirable. In the recycle work as well, a component configuration that can be easily disassembled is desirable. In this way, the disassembly repair cost at the time when a defect has been found can be regarded as the evaluation of the maintainability and the evaluation of the recycling ability. Depending on the product, the result can be grasped from a different point of view and utilized for design improvement.

The calculation of the disassembly cost will now be described again. As for the coefficients used in the evaluation calculation, the disassembly repair time evaluation database 413 and the cost evaluation database 414 shown in FIGS. 1 and 3 are referred to. Furthermore, as for the disassembly time estimation, a calculation similar to that for the assembly work time estimation is conducted. Basically, time taken to execute an operation opposite to assembly operation and preset at the time of assembly is referred to. Since the disassembly time is different from the assembly time in many cases, however, a different database is used. In addition, as for the assembly work for which disassembly cannot be conducted easily, such as welding, soldering and binding, those operations are preset in a disassembly prohibiting operation table as assembly operations prohibiting disassembly, and stored in the database. As for a component involving an assembly operation judged to be a disassembly prohibiting operation, a range up to a component that can be disassembled on the basis of the acquired interrelation route among components is handled as a one-body subassembly, and time required to remove the subassembly is calculated. If all components are judged to be incapable of being disassembled or it is judged that defective components cannot be removed, the disassembly work time becomes 0. Here, an abandonment cost may be calculated from the material of the defective component and the total weight, and added to the evaluation of the disassembly repair cost.

Furthermore, as for the calculation of the inspection cost and the degree of importance of a component (defect countermeasure cost), an inspection work setting condition that minimizes the quality cost, i.e., the inspection cost and the defect countermeasure cost can be found by conducting calculations for all inspection work positions and their inspected components. This is a method of calculating the sum total of prevention costs including a cost required for the inspection work preset as the process design information, calculating the sum total of defect costs including a cost required for the countermeasure at the time when a component defect has been found, and conducting arithmetic processing to search for a process setting condition minimizing the sum of the prevention cost and the defect cost with respect to combinations of inspection works that can be set between steps of the assembly work. Owing to this method, an optimum condition of the process minimizing the quality cost can be calculated.

The present invention aims at solving the problem that the degree of fatality (failure occurrence frequency×influence degree of the failure×detection degree of the failure) in the FEMA is a qualitative evaluation and an evaluation in which an individual difference is apt to occur, conducting a quantitative evaluation, and conducting an evaluation with reduced individual difference.

(8.5) Component Fraction Defective 1632 and Degree of Importance 253

The component fraction defective 1632 and the degree of importance 253 will now be described.

In the present embodiment, the degree of importance 253 (the degree of fatality) is calculated by multiplying the "assembly fraction defective and component failure rate" and "disassembly repair cost when a defect has been found at the preset inspection point in time" and multiplying a result by a coefficient. Specifically, in the present embodiment, a value with the defect occurrence frequency, the influence degree of the defect and the detection degree of the defect evaluated synthetically is calculated by multiplying the disassembly repair cost 255 at the time when a defect has been found in the inspection before shipping by the assembly and component failure rates and then multiplying a resultant product by a coefficient ¹/₁₀₀₀.

The component fraction defective 1632 displays a result obtained by calculating a fraction defective, i.e., either the assembly fraction defective or the component failure rate, in the case where a defect has occurred. In other words, it is a result obtained by conducting a parallel model calculation of the assembly fraction defective and the component failure rate. Furthermore, the disassembly repair cost 255 at the time when a defect has been found is a calculation result at the point of "confirmation work" in time as described above, and the columns of "function test" and "inspection before shipping" also show the calculation result at the point of work in time in the same way. Therefore, a cost required to detect a defect when the defect has occurred and take a countermeasure with due regard to influence between the component and other components, at that point in time can be quantitatively evaluated as the degree of importance of the component.

(8.6) Degree of Importance 252 of Process

The degree of importance 252 of process will now be described.

As for the process as well, its degree of importance 252 is calculated, and displayed in a row under the table. As for the calculation of the degree of importance 252 of process, a fraction defective of a component obtained by conducting a parallel model calculation of the assembly fraction defective and the component failure rate is used, and it is multiplied by fraction defectives of components having a relation to the component at the point of work in time, together with coefficients. In this example, the coefficient of the assembly component is set equal to 1, and coefficients of other components are set to 0.5. A result obtained by conducting the parallel model calculation on fraction defectives of all components relating to the work is indicated. As a result, evaluation with due regard to the relations to other components in the assembly work of the component can be conducted.

As for the items and their calculation methods, different ways of thinking and calculation methods are also conceivable. For example, viewing the product design information 111, the process design information 122 and the interrelation diagram among components 202 from the viewpoint of human error, a different calculation becomes necessary. As error modes of the human error, there are "work omission", "mistake in the number of times", "execution of an unnecessary work" and "mistake in sequence." For example, as for the "work omission", it can be considered that errors decrease as the relevancy to other components becomes high. For example, in the example shown in FIG. 16, the B_Plate having the most symbols in a column in the interrelation diagram among components can be evaluated as a component for which an error of "work omission" is hard to be overlooked. As an evaluation similar to this way of thinking, it is also possible to determine whether there is not a redundant structure and extra inspection work. As the evaluation of the "mistake in the number of times", components for which work duplication occurs and components for which assembly of the same component and confirmation work are continuously conducted can be evaluated as components in which the "mistake in the number of times" tends to occur.

By thus utilizing the product design information 111, the process design information 122 and the interrelation diagram among components 202, a wide variety of evaluation results can be output and the design support can be conducted. And evaluation with due regard to the nature of components, the sequence of assembly works, interrelation among components, and the process flow such as the inspection process can be conducted. The quality cost with the calculation of the defect loss cost and the calculation of the inspection prevention cost integrated can also be estimated. The design with the quality cost rationalized can be promoted. In FIG. 16, a state in which components are arranged in the order of assembly is shown. As a different form, however, a table or a graph with components rearranged in the order of decreasing necessity of design improvement (in the order of decreasing importance) may also be displayed. As for the interrelation diagram among components, the form in which components represented by rectangular frames are coupled by curved lines as shown in FIG. 9 and the example in which the contact relations are displayed by symbols in the table as shown in FIG. 16 have been described. However, the interrelation diagram among components may be represented by using model information of a viewer converted from the three-dimensional CAD. For example, components having a relation to a selected component are represented by a predetermined color, and components having a relation to these components are represented with a slightly light color. In this way, the depth of the relativity of components may be represented with a color depth.

By utilizing the defect influence degree evaluation method and the design support system heretofore described in the product design department and the process design department, it is possible to conduct the defect influence degree evaluation quantitatively at the design stage and grasp the points in design to be improved on the basis of the degree of importance of components and the degree of importance of processes output as the evaluation result. In this method, automatic calculations are conducted by reading the product design information and inputting the process design information. Therefore, evaluation can be conducted in a short time, and evaluation without an individual difference can be conducted without depending upon the experience of the evaluator. As a result, at the design stage, the product design improvement and the process design improvement become possible, resulting in a quality improvement.

It is also conceivable to conduct computation processing of the prevention cost including the cost required for the inspection work preset as the process design information, conduct computation processing of the defect cost including the cost required for the countermeasure at the time when a component defect has been found, search for a process setting condition minimizing the sum of the prevention cost and the defect cost with respect to the combination of inspection works which can be set between steps of the assembly work, and display the computation process and a result.

As for the design support system, it is conceivable to make a maintenance plan after product delivery as the process design information, prepare an evaluation information database for evaluating the inspection operation, disassembly operation and exchange operation of components at the time of maintenance, input the inspection, disassembly and exchange operation of a component to be operated at the time of maintenance and a linking relation among components attendant thereupon, provide calculation means for estimating the work fraction defective at the time of maintenance with respect to the component maintenance operation, and evaluate the defect influence degree at the time of maintenance work.

Furthermore, the defect influence degree evaluation can be conducted by using the defect influence propagation route calculated from the design information together with the assembly fraction defective estimation result. This is a method of conducting the defect influence degree evaluation with due regard to the process design information. Owing to this method, therefore, it is possible to study at the design stage the product design and the process design in synchronism, and it is possible to conduct evaluation quantitatively. As a result, it becomes easy to grasp the difference between the target value and the actual result value of the design at the current stage. Furthermore, since the points of the design improvement can be expressed clearly as the degree of importance of components and the degree of importance of processes, the design improvement can be promoted efficiently. In addition, since in this method the evaluation computation processing is automatically conducted by automatically acquiring the product design information and then inputting the process design information, evaluation without an individual difference can be executed in a short time. Furthermore, the defect influence degree evaluation method utilizing the interrelations among components is effective as an evaluation method of human errors such as work oblivion.

In addition, by defining basic functions for respective components and using the interrelation diagram among components calculated from the design information, the interrelation diagram of the component configuration classified by the basic functions can be displayed. It can be utilized for unification of the same function or design support to unification of the same function. Furthermore, by representing the defect influence propagation route by using defined basic functions, the function interrelation diagram can be created. Furthermore, it becomes easy to refer to the past design instances as to similar function combinations and component configuration combinations. As a result, effective utilization of know-how can be achieved, and similar defects can be reduced.

In this way, according to the present invention, the evaluation of the defect influence degree can be evaluated at the design stage, and the product design improvement and the process design improvement become possible, resulting in an improved quality.

According to the present invention, it is possible to at the stage before manufacture (at the product design stage or the design stage of the manufacturing process) estimate the influence of the occurrence of a defect in a certain component or process on other components and processes, estimate the degree of importance of a defect, and support the design of the manufacturing process.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A defect influence degree evaluation method to be used at a design stage of a product including a plurality of components to calculate an assembly fraction defective, which represents a rate of becoming defective, with respect to an assembly process of each of the components included in the product, and evaluate an influence degree of each component and an influence degree of each process on the basis of the assembly fraction defective and design information of the product, the defect influence degree evaluation method comprising the steps of:

previously storing a failure rate of each of the components in a database;

extracting component arrangement relations among components included in the product from the design information of the product;

calculating a fraction defective of each of the components on the basis of the assembly fraction defective and the failure rate of the component; and multiplying a component fraction defective by a coefficient to obtain a resultant product with respect to each of components each having a relation at time when conducting each assembly process, on the basis of the component arrangement relations and a fraction defective of the component, calculating a numerical value indicating an influence degree of each assembly process by multiplying resultant products for the components each having a relation, and thereby evaluating an influence degree of each component and an influence degree of each process.

2. A defect influence degree evaluation method to be used at a design stage of a product including a plurality of components to calculate an assembly fraction defective, which represents a rate of becoming defective, with respect to an assembly process of each of the components included in the product, and evaluate an influence degree of each component and an influence degree of each process on the basis of the assembly fraction defective and design information of the product, the defect influence degree evaluation method comprising the steps of:
- extracting component arrangement relations among components included in the product from the design information of the product;
- calculating a cost required for a countermeasure against a defect in the assembly process of each component, on the basis of the component arrangement relations, when the defect has been found, and evaluating an influence degree of each component on the basis of the cost required for the countermeasure against the defect and the assembly fraction defective of the assembly process.

3. A design support system for supporting design by evaluating, at a design stage of a product including a plurality of components, an influence degree of each of the components and an influence degree of an assembly process of the component, the design support system comprising:
- input means, output means, calculation means, storage means, and interface means serving as an interface to a design system for designing the product;
- said storage means comprising a defect instance database for storing failure rates respectively of the components, and an assembly defect evaluation database; and
- said calculation means extracting component arrangement relations among components included in the product from the design information of the product, calculating an assembly fraction defective, which represents a rate of becoming defective, with respect to an assembly process of each of the components included in the product by referring to said assembly defect evaluation database, calculating a fraction defective of each of the components on the basis of the assembly fraction defective and the failure rate of the component, and conducting processing of outputting the calculated results to said output means.

4. A design support system for supporting design by evaluating, at a design stage of a product including a plurality of components, an influence degree of each of the components and an influence degree of an assembly process of the component, the design support system comprising:
- input means, output means, calculation means, storage means, and interface means serving as an interface to a design system for designing the product;
- said storage means comprising a cost evaluation database for storing data concerning costs respectively of the components, and an assembly defect evaluation database; and
- said calculation means extracting component arrangement relations among components included in the product from the design information of the product, calculating an assembly fraction defective, which represents a rate of becoming defective, with respect to an assembly process of each of the components included in the product by referring to said assembly defect evaluation database, calculating a cost required for a countermeasure against a defect in the assembly process of each component, on the basis of the component arrangement relations and data stored in said cost evaluation database, when the defect has been found, evaluating an influence degree of each component on the basis of the cost required for the countermeasure against the defect and the assembly fraction defective of the assembly process, and thereby supporting the design.

5. A design support system for supporting design by evaluating, at a design stage of a product including a plurality of components, an importance degree of each of the components and an influence degree of an assembly process of the component, the design support system comprising:
- input means, output means, calculation means, storage means, and interface means serving as an interface to a design system for designing the product; and
- said storage means comprising a cost evaluation database for storing data concerning costs respectively of the components; and
- wherein when design information is input to the design support system from the design system, the design support system calculates an importance degree of each of the components and an importance degree of an assembly process for each of the components on the basis of the input design information and the data stored in said storage means, and conducts processing of outputting the importance degree of each of the components and the importance degree of the assembly process to said output means.

6. A design support system for supporting design by evaluating, at a design stage of a product including a plurality of components, an influence degree of each of the components and an influence degree of an assembly process of the component, the design support system comprising:
- an input unit, an output unit, a calculation unit, a storage, and an interface interfacing a design system for designing the product;
- said storage comprising a defect instance database for storing failure rates respectively of the components, and an assembly defect evaluation database; and
- said calculation unit extracting component arrangement relations among components included in the product from the design information of the product, calculating an assembly fraction defective, which represents a rate of becoming defective, with respect to an assembly process of each of the components included in the product by referring to said assembly defect evaluation database, calculating a fraction defective of each of the components on the basis of the assembly fraction defective and the failure rate of the component, and conducting processing of outputting the calculated results to said output unit.

7. A design support system for supporting design by evaluating, at a design stage of a product including a plurality of components, an influence degree of each of the components and an influence degree of an assembly process of the component, the design support system comprising:
- an input unit, an output unit, a calculation unit, a storage, and an interface interfacing a design system for designing the product;
- said storage comprising a cost evaluation database for storing data concerning costs respectively of the components, and an assembly defect evaluation database; and
- said calculation unit extracting component arrangement relations among components included in the product from the design information of the product, calculating an assembly fraction defective, which represents a rate of becoming defective, with respect to an assembly process of each of the components included in the product by referring to said assembly defect evaluation database, calculating a cost required for a countermeasure against a defect in the assembly process of each component, on the basis of the component arrangement relations and data stored in said cost evaluation database, when the defect has been found, evaluating an influence degree of each component on the basis of the cost required for the countermeasure against the defect and the assembly fraction defective of the assembly process, and thereby supporting the design.

8. A design support system for supporting design by evaluating, at a design stage of a product including a plurality of components, an importance degree of each of the components and an influence degree of an assembly process of the component, the design support system comprising:

an input unit, an output unit, a calculation unit, a storage, and an interface interfacing a design system for designing the product; and said storage comprising a cost evaluation database for storing data concerning costs respectively of the components; and wherein when design information is input to the design support system from the design system, the design support system calculates an importance degree of each of the components and an importance degree of an assembly process for each of the components on the basis of the input design information and the data stored in said storage means, and conducts processing of outputting the importance degree of each of the components and the importance degree of the assembly process to said output unit.

* * * * *